(12) United States Patent
Fubuki et al.

(10) Patent No.: US 9,065,316 B2
(45) Date of Patent: Jun. 23, 2015

(54) STATOR CORE SLOT AND POLE PIECE ARRANGEMENT FOR STATOR STRUCTURE OF A ROTARY ELECTRIC MACHINE

(75) Inventors: Shingo Fubuki, Toyota (JP); Yasuji Taketsuna, Okazaki (JP); Yasushi Nishikuma, Toyota (JP); Katsuhiko Tatebe, Seto (JP); Tomohiro Takenaga, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 274 days.

(21) Appl. No.: 13/518,311

(22) PCT Filed: Dec. 23, 2009

(86) PCT No.: PCT/JP2009/071350
§ 371 (c)(1),
(2), (4) Date: Jun. 21, 2012

(87) PCT Pub. No.: WO2011/077521
PCT Pub. Date: Jun. 30, 2011

(65) Prior Publication Data
US 2012/0256512 A1    Oct. 11, 2012

(51) Int. Cl.
*H02K 3/34* (2006.01)
*H02K 3/487* (2006.01)

(52) U.S. Cl.
CPC ............ *H02K 3/345* (2013.01); *Y10T 29/49009* (2015.01); *H02K 3/487* (2013.01)

(58) Field of Classification Search
CPC .......... H02K 3/34; H02K 3/345; H02K 3/487
USPC ..................................... 310/215, 214
See application file for complete search history.

(56) References Cited

U.S. PATENT DOCUMENTS 3,745,394 A * 7/1973 Mason .......................... 310/215
4,808,872 A * 2/1989 Lund et al. .................... 310/215
(Continued)

FOREIGN PATENT DOCUMENTS

| JP | 61189153 A | 8/1986 |
|---|---|---|
| JP | 08-237897 A | 9/1996 |
| JP | 2000-050553 A | 2/2000 |

(Continued)

OTHER PUBLICATIONS

Machine translation of JP2007-274809A (Oct. 2007).*

(Continued)

*Primary Examiner* — Michael Andrews
(74) *Attorney, Agent, or Firm* — Kenyon & Kenyon LLP

(57) ABSTRACT

A stator structure for a rotary electric machine includes a stator core having a cylindrical shape in which slots and pole pieces are formed on an inner peripheral side and alternately arranged in a circumferential direction, a conductor segment which is a conducting wire having a rectangular cross section inserted in one of the slots through an insulator being connected with a conductor segment similarly inserted in another slot to form a coil. Each insulator has a shape including a pair of opposite side surface portions connected with an intermediate portion along a wall surface defining the slot. Each insulator includes end protrusions facing each other at free ends of the side surface portions to position the conductor segments. The insulators are made of an insulating and elastic material.

8 Claims, 11 Drawing Sheets

(56) References Cited

U.S. PATENT DOCUMENTS

| | | |
|---|---|---|
| 2002/0014806 A1 | 2/2002 | Senoo et al. |
| 2009/0096313 A1* | 4/2009 | Harada et al. ................. 310/201 |

FOREIGN PATENT DOCUMENTS

| | | | | |
|---|---|---|---|---|
| JP | 2002-051512 A | 2/2002 | | |
| JP | 2003-070201 A | 3/2003 | | |
| JP | 2003-116241 A | 4/2003 | | |
| JP | 2004112856 A | 8/2004 | | |
| JP | 2005-110360 A | 4/2005 | | |
| JP | 2005-323433 A | 11/2005 | | |
| JP | 2006042500 A | 2/2006 | | |
| JP | 2006-262629 A | 9/2006 | | |
| JP | 2007-274809 A | 10/2007 | | |
| JP | 2007274809 A * | 10/2007 | ............... | H02K 3/34 |
| JP | 2008-503993 A | 2/2008 | | |
| JP | 2008-289284 A | 11/2008 | | |
| KR | 20020011858 A | 2/2002 | | |
| WO | 2006/006242 A1 | 1/2006 | | |
| WO | 2006/007425 A1 | 1/2006 | | |
| WO | WO 2006006242 A1 * | 1/2006 | ............... | H02K 3/34 |
| WO | WO 2008027535 A2 * | 3/2008 | ............... | H02K 1/04 |

OTHER PUBLICATIONS

Machine translation of WO 2006/006242 A1 (Jan. 2006).*
International Search Report of PCT/JP2009/071350 mailed Mar. 16, 2010.

* cited by examiner

STATOR CORE SLOT AND POLE PIECE ARRANGEMENT FOR STATOR STRUCTURE OF A ROTARY ELECTRIC MACHINE

CROSS-REFERENCE TO RELATED APPLICATIONS

This is a 371 national phase application of PCT/JP2009/071350 filed on 23 Dec. 2009, the entire contents of which are incorporated herein by reference.

FIELD OF THE INVENTION

The present invention relates to an electric motor or an electric generator (collectively referred to as a "rotary electric machine") and particularly to a stator structure in which a coil is placed in a slot of a stator core through an insulator.

BACKGROUND OF THE INVENTION

Recently, rotary electric machines such as an electric motor and an electric generator are mounted in various types of devices and hence they are demanded for higher functionality and smaller size and weight. For instance, an automobile with the limited space for mounting such a rotary electric machine also highly needs a high power and reduced weight electric machine. Regarding such a rotary electric machine, Patent document 1 listed below discloses a stator structure in which coils are placed in slots of a stator core.

FIG. 10 is a plan view showing a part of a stator core disclosed in Patent document 1. A stator core 100 has a cylindrical shape and is formed, on its inner peripheral side, with slots 111 shaped like grooves each extending along an axial direction (vertical to the drawing sheet) of the stator core 100. The slots 111 are arranged in a circumferential direction to provide a plurality of protruding pole pieces 112 each being located between adjacent two of the slots 111. A coil wire is wound around each pole piece 112 by extending between one slot 111 to another slot 111. Herein, a coil is formed of conductor segments 115 which are conducting wires each having a rectangular cross section.

FIG. 11 is an enlarged view of one of the slots 111. This slot 111 is a groove having a rectangular cross section and has protrusions 114 whereby the width of an opening 113 is made narrower than the inner width. An insulator 116 made of an insulating material is inserted in the slot 111. The opening 113 is designed so that an interval 117 (see FIG. 10) between opposite protrusions 114 is slightly wider than the thickness of each conductor segment 115 and the width of the insulator 116 set in the slot 111 is approximately equal to the interval 117. Therefore, in an assembling method for such a conventional stator structure, the insulator 116 is first inserted in the slot 111 and then a predetermined number of the conductor segments 115 are inserted in the slot 111.

RELATED ART DOCUMENTS

Patent Documents

Patent Document 1: JP 2008-503993 A

SUMMARY OF THE INVENTION

Problems to be Solved by the Invention

In the conventional stator structure related to the rotary electric machine, the protrusions 114 are formed in the opening 113 of the slot 111 with the interval 117 wider than the thickness of each conductor segment 115. Accordingly, it is easy to insert the conductor segments 115 into the slot 111, but because of this, the conductor segments 115 are apt to be dislocated. This is because the protrusions 114 serve to position the insulator 116 in place but does not function to position the conductor segments 115.

In the conventional stator structure, therefore, the rotary electric machine could not be configured with the conductor segments 115 arranged neatly as shown in FIG. 10 in every slot 111. The conductor segments 115 are actually dislocated, a distance 118 from the conductor segment 115 to an end of the pole piece 112 in FIG. 11 becomes nonuniform from slot to slot. When the conductor segments 115 are dislocated toward the opening 113, making the distance 118 shorter, a magnetic flux from a rotor not shown to the pole piece 112 passes through the conductor segments 115, generating eddy currents, resulting in deterioration in performance of the rotary electric machine.

The present invention therefore has a purpose to provide a stator structure for rotary electric machine and a method of mounting a stator, whereby conductor segments can be positioned accurately.

Means of Solving the Problems

To achieve the above purpose, one aspect of the invention provides a stator structure for rotary electric machine including a stator core having a cylindrical shape in which slots and pole pieces are formed on an inner peripheral side and alternately arranged in a circumferential direction, a conductor segment which is a conducting wire having a rectangular cross section inserted in one of the slots through an insulator being connected with a conductor segment similarly inserted in another slot to form a coil, wherein each insulator has a shape including a pair of opposite side surface portions connected with an intermediate portion along a wall surface defining the slot, each insulator includes end protrusions formed at free ends of the side surface portions to protrude from the side surface portions in a direction to face each other to position the conductor segment, and the insulators are made of an insulating and elastic material.

In the above stator structure for rotary electric machine, preferably, the pair of side surface portions of each insulator have a larger interval on a free end side than on an intermediate portion side.

In the above stator structure for rotary electric machine, preferably, each insulator is formed with positioning protrusions on the side surface portions, and the wall surface of each slot is formed with recesses in which the positioning protrusions are fitted.

In the above stator structure for rotary electric machine, preferably, each insulator includes a collar at an end connecting the side surface portions and the intermediate portion so as to be located at an end face of the stator core in an axial direction, the collar being formed to extend almost perpendicular to the side surface portions and the intermediate portion.

In the above stator structure for rotary electric machine, preferably, the insulators individually inserted in the adjacent slots are formed with a size so that the collar of one of the insulators and the collar of the other insulator overlap one on the other on the pole piece.

In the above stator structure for rotary electric machine, preferably, each insulator is configured such that the collar located on one of the pair of opposite side surface portions is dislocated from the collar located on the other side surface portion in the axial direction of the stator core.

In the above stator structure for rotary electric machine, preferably, each insulator is formed with a cutout in the collar at a position corresponding to the intermediate portion.

In the above stator structure for rotary electric machine, preferably, the intermediate portion of each insulator extends from the collar to form an extending portion.

In the above stator structure for rotary electric machine, preferably, each of the end protrusions of each insulator is formed with a curved surface at a corner.

Another aspect of the invention provides a method of mounting a stator for rotary electric machine including a stator core having a cylindrical shape in which slots and pole pieces are formed on an inner peripheral side and alternately arranged in a circumferential direction, a conductor segment which is a conducting wire having a rectangular cross section inserted in one of the slots through an insulator being connected with a conductor segment similarly inserted in another slot to form a coil, wherein the method including: inserting and holding a predetermined number of the conductor segments in each insulator having a shape including a pair of opposite side surface portions connected with an intermediate portion along a wall surface defining the slot, and inserting the insulators holding the conductor segments into the slots, a distance between end protrusions formed at free ends of the side surface portions of each insulator is smaller than the thickness of each conductor segment after the insertion so that the conductor segments are positioned by the end protrusions.

Effects of the Invention

According to the present invention, the conductor segments are set and held in the insulators outside the slots and then the conductor segments and the insulators are integrally inserted in the slots to be mounted therein. For mounting, the conductor segments can be easily inserted in each insulator while an inserting part thereof is widened. After mounting, the conductor segments can be precisely positioned without dislocation by the protrusions at a narrowed interval therebetween.

Further, since each insulator is formed so that the side surface portions are widened on free end sides, an inserting work for the conductor segments can be made easy. The positioning protrusions formed on the side surface portions are simply inserted in the recesses on the wall surface defining the slot, thereby easily fixing each insulator to the stator core. Since the collar is provided in each insulator at a position corresponding to an end face of the stator core in the axial direction, a creepage distance from a bent of each conductor segment located on a coil end part to the stator core is ensured, thus enhancing reliability to insulation.

DESCRIPTION OF THE REFERENCE SIGNS

Figure 1:
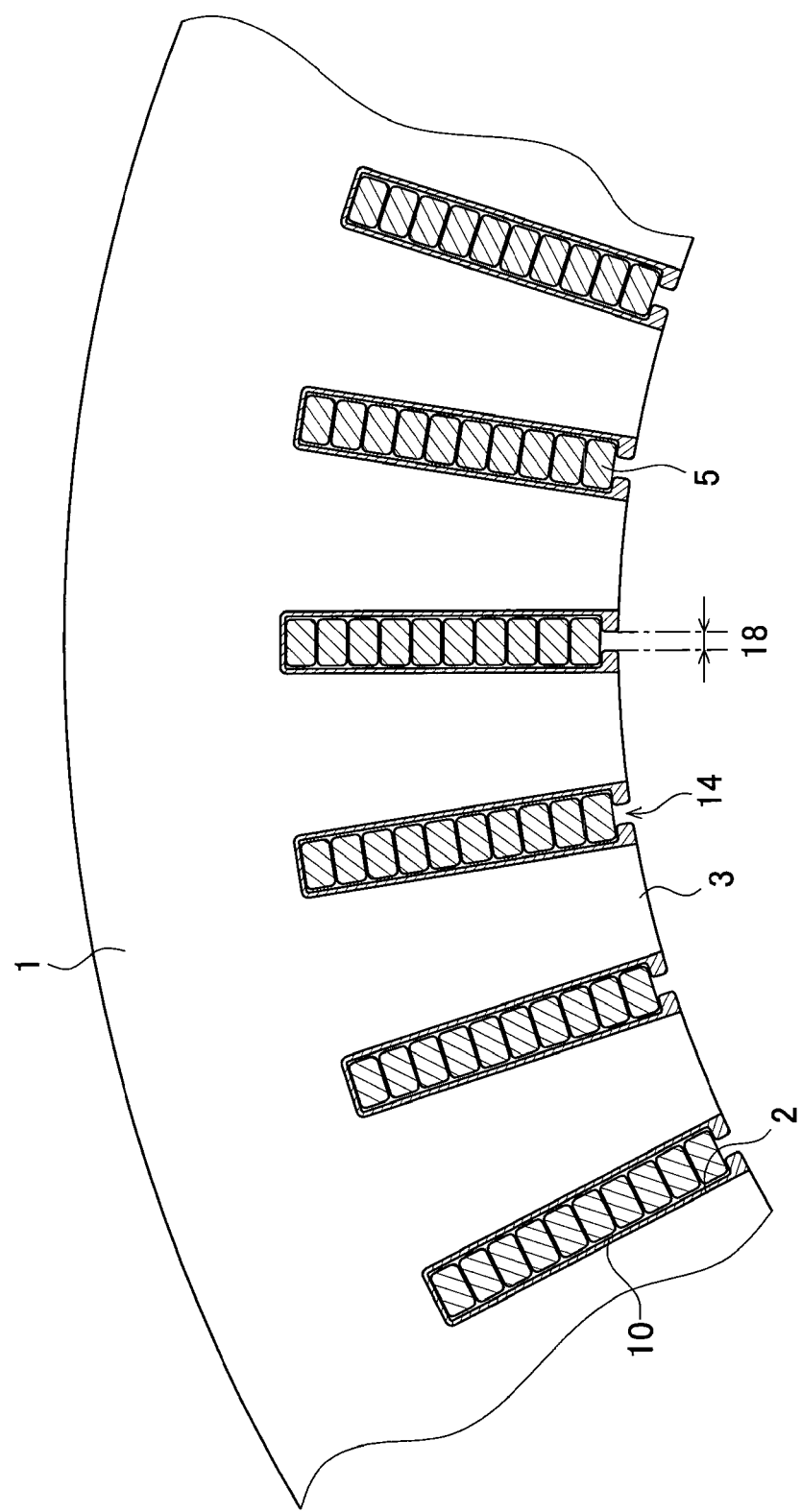
FIG. 1 is a plan view of a stator structure in a first embodiment.

1 Stator core
2 Slot
3 Pole piece
5 Conductor segment
10 Insulator
11, 13 Side surface portion
12 Intermediate portion
14 Opening
15 End protrusion

DETAILED DESCRIPTION

A detailed description of a preferred embodiment of a stator structure for rotary electric machine and a stator assembling method embodying the present invention will now be given referring to the accompanying drawings. FIG. 1 is a plan view of a stator structure in a first embodiment. A stator core 1 has a cylindrical shape and is formed, on its inner peripheral side, with a plurality of groove-shaped slots 2 each extending in an axial direction (vertical to the drawing sheet) of the core 1. The slots 2 are arranged in a circumferential direction to provide a plurality of pole pieces 3 each protruding between adjacent two of the slots 2.

Figure 4:
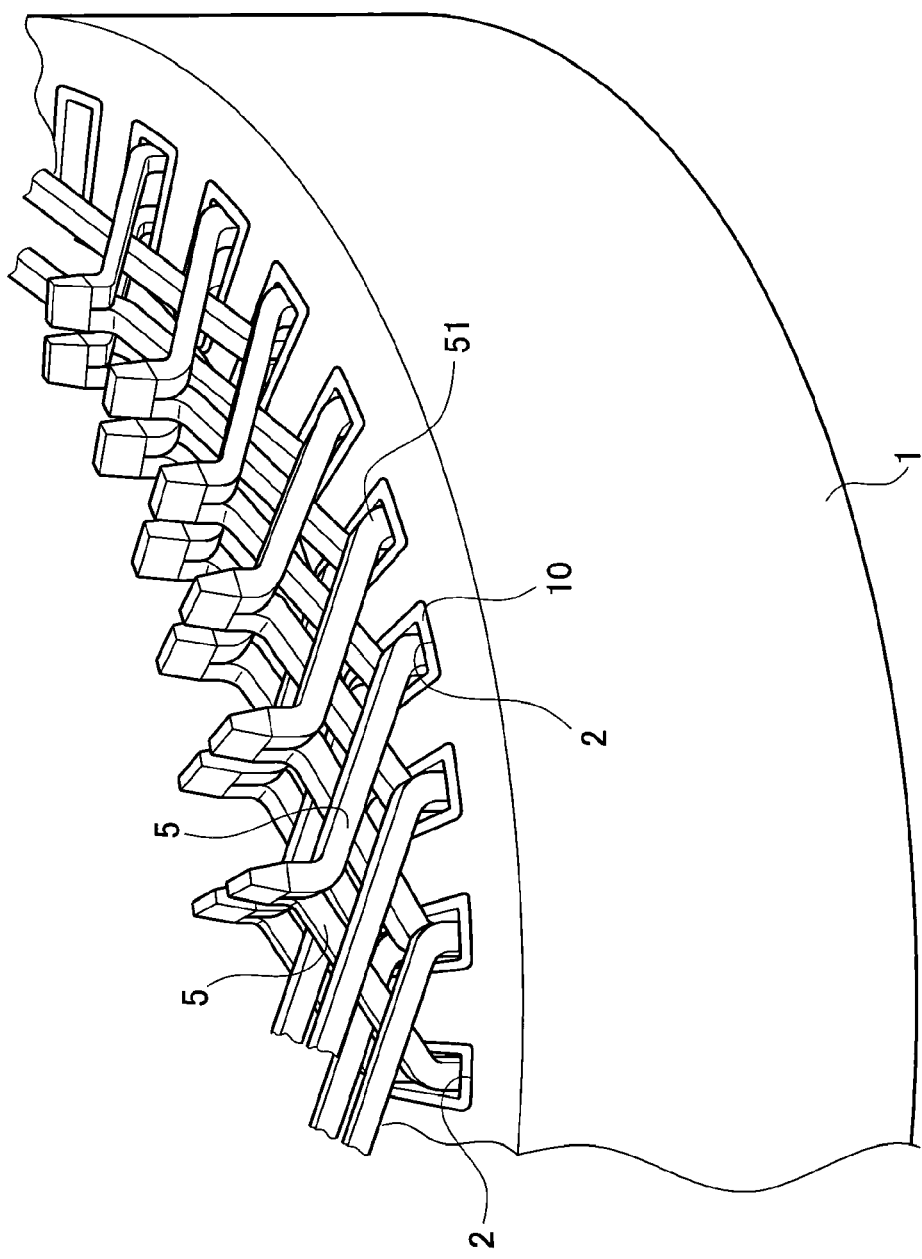
FIG. 4 is a perspective view of a coil end portion of the stator when seen from an outer periphery side.

In the stator of the present embodiment, as with a conventional one, a coil is formed of conductor segments 5 each having a rectangular cross section. The conductor segments 5 are arranged in row and inserted in each slot 2. FIG. 4 is a perspective view showing a coil end part of the stator seen from an outer peripheral side. The coil is made in such a manner that the conductor segments 5 inserted in one slot 2 and the conductor segments 5 inserted in another slot 2, each segment 5 protruding in the axial direction of the stator core 1, are bent in the circumferential direction so that respective ends portions are joined to each other.

Figure 2:
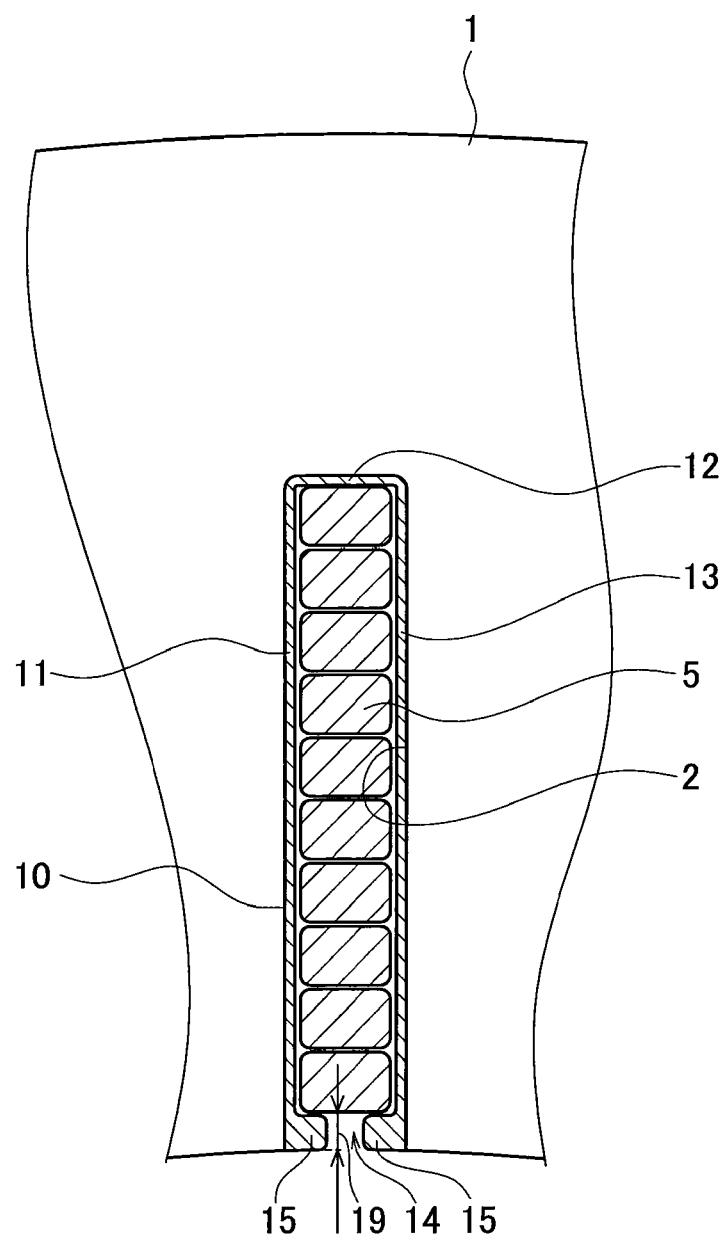
FIG. 2 is an enlarged view of one slot of the stator structure shown in FIG. 1.

FIG. 2 is an enlarged view showing one of the slots 2 in FIG. 1. Each slot 2 is formed with a uniform width in every portion from an opening on the inner peripheral side to the outer peripheral side of the stator core 1. Specifically, the slot 2 in the present embodiment is not formed with any protrusions in the opening, unlike the conventional example. Instead, a pair of end protrusions 15 are formed in an insulator 10 made of an insulating material inserted in the slot 2. The insulator 10 has a shape adapted to the groove shape of the slot 2 and includes side surface portions 11 and 13 and an intermediate portion 12, which contact with wall surface of the slot 2. The end protrusions 15 are formed at free ends of the side surface portions 11 and 13 defining an opening 14 of the insulator 10 so that the end protrusions 15 face each other.

Meanwhile, the present embodiment provides a mounting method achieved by first setting a predetermined number of the conductor segments 5 in the insulator 10 and then mounting the conductor segments 5 and the insulator 10 together in the slot 2. Therefore, when the conductor segments 5 are to be inserted in the insulator 10, the insulator 10 needs to be deformed to widen the opening 14 in order to avoid hitting against the end protrusions 15. The insulator 10 is therefore made of an unreinforced material that is slightly deformable. One example of this material is polyphenylene sulfide resin (PPS) with high strength and high elasticity as compared with other resins.

Each end protrusion 15 has a rectangular cross section as illustrated and is designed with round corners to prevent damage to an insulating coating of the conductor segments 5 even when hits or bump against the conductor segments 5. The insulator 10 is designed so that the distance between the opposite end protrusions 15, i.e., the width 18 (see FIG. 1) of the opening 14 in a state where the insulator 10 is mounted in the slot 2 is smaller than the thickness of each conductor segment 5. The end protrusions 15 serve as a positioning means to prevent the conductor segments 5 from becoming dislocated after mounted in the slot 2.

Figure 3:
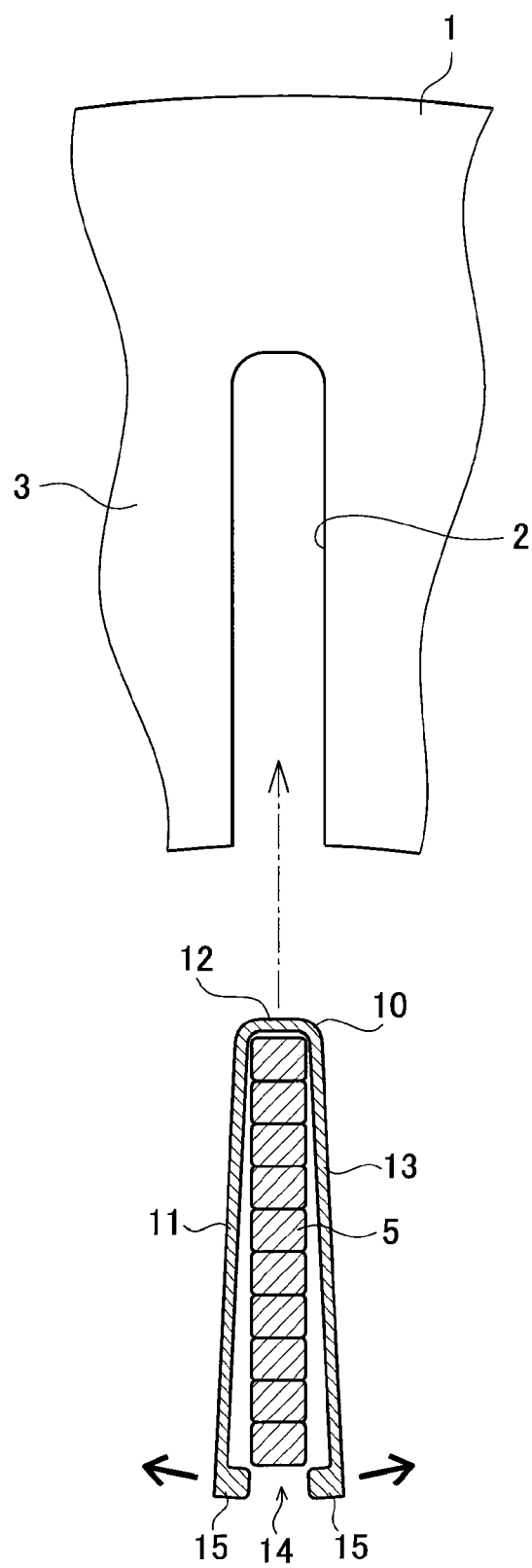
FIG. 3 is a view showing a mounting method for the stator structure in the first embodiment.

The stator structure of the present embodiment differs in the mounting method of the conductor segments to the stator core 1 from conventional structures. FIG. 3 is a view showing how to mount the conductor segments 5 in a slot 2. To be more specific, a predetermined number of the conductor segments 5 are set in the insulator 10 outside the slot 2. The insulator 10 is deformed by warping the side surface portions 11 and 13 outward to increase the interval between the end protrusions 15 to widen the opening 14. The conductor segments 5 are then inserted in the insulator 10 through the widened opening 14. Thereafter, the insulator 10 is returned to its original shape by closing the side surface portions 11 and 13. The insulator 10 holding therein the conductor segments 5 is directly inserted in the slot 2 of the stator core 1. The insulator 10 inserted in the slot 2 is fixed therein with adhesive.

In the present embodiment, while the insulator 10 is in a free state without being restricted by the slot 2, the conductor segments 5 are set in the insulator 10. Accordingly, even though the opening 14 is smaller than the conductor segment 5 after the conductor segments 5 are mounted as shown in FIG. 2, the conductor segments 5 are easily set in the insulator 10. At that time, the conductor segments 5 are inserted smoothly in the insulator 10 through the widened opening 14, so that the insulating coating of each conductor segment 5 is not damaged, such as scratched, thus achieving stable quality. Since the conductor segments 5 are positioned in place by the end protrusions 15, a distance 19 from the conductor segment 5 located closest to the opening 14 to the end faces of the pole pieces 3 is constant between the slots 2 in any positions after the conductor segments 5 are mounted in the slots 2. This can prevent the conductor segments 5 from becoming too close to a rotor not shown and hence prevent performance deterioration of the rotary electric machine due to the occurrence of eddy currents.

Figure 5:
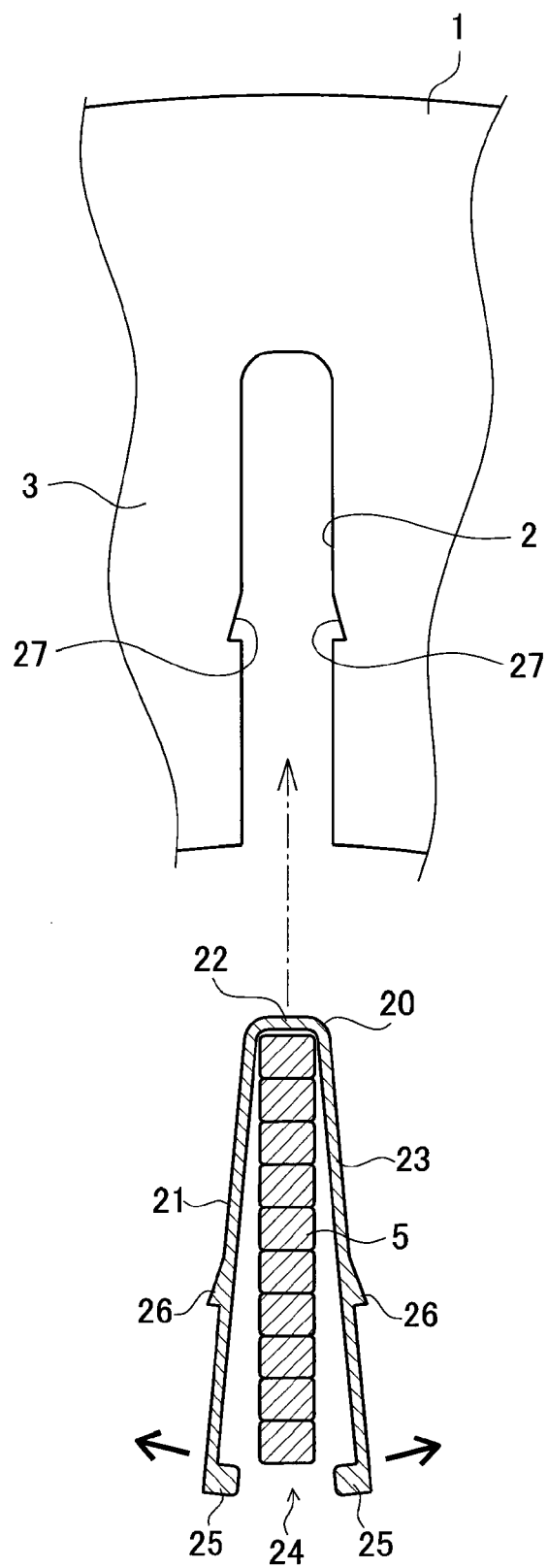
FIG. 5 is a view showing a mounting in a slot of a stator structure in a second embodiment.

A stator structure of a rotary electric machine in a second embodiment will be explained below. FIG. 5 is a view showing how to mount conductor segments in a slot in the stator structure of the present embodiment. Similar or identical parts to those in the first embodiment are given the same references as those in the first embodiment. An insulator 20 includes side surface portions 21 and 23 and an intermediate portion 22 to match the groove shape of the slot 2. A pair of end protrusions 25 are formed to face each other at free ends of the side surface portions 21 and 23. In the present embodiment, however, the side surface portions 21 and 23 are not parallel and are originally wider at their ends on the opening 24 side than the intermediate portion 22 side. The insulator 20 is made of an insulating and elastic material such as PPS.

A wall surface defining the slot 2 is formed with recesses 27. Correspondingly, positioning protrusions 26 are formed on the side surface portions 21 and 23 of the insulator 20. Those positioning protrusions 26 and recesses 27 are intended to reliably position the insulator 20 in the slot 2 without using any adhesive. Each of the positioning protrusions 26 has a slant surface whose height decreases from the opening 24 side to the intermediate portion 22 side, i.e., in an inserting direction of the insulator 20, a surface located on the opening 24 side perpendicular to the side surface portion 21 or 23, and surfaces on both sides in the axial direction. The recesses 27 are formed to conform to the shapes of the positioning protrusions 26.

The mounting method for the stator structure in the present embodiment is also achieved by inserting a predetermined number of the conductor segments 5 into the insulator 20 outside the slot 2. Since the insulator 20 has the wide opening 24 defined between the end protrusions 25 originally at a large distance from each other, the conductor segments 5 are directly inserted in the insulator 20 through such opening 24. The insulator 20 holding the conductor segments 5 therein is then mounted in the slot 2 of the stator core 1. At that time, the positioning protrusions 26 are snagged. However, the insulator 20 is forcedly pushed into the slot 2 by slightly deforming the positioning protrusions 26. The insulator 20 fully inserted in the slot 2 with the positioning protrusions 26 fitted in the recesses 27 is held against movement in any direction. Thus, the insulator 20 is positioned in place without dislocation.

In the present embodiment, the conductor segments 5 are first held in the insulator 20 and then inserted in the slot 2. This mounting work is easy. In particular, the openings 24 of the insulator 20 is originally widened, thus making it easy to set the conductor segments 5 in the insulator 20. When the insulator 20 is mounted in the slot 2, elastic forces of the side surface portions 21 and 23 attempting to expand increase frictional resistance against the wall surface of the slot 2. Thus, the insulator 20 is less dislocated. In the present embodiment, however, the positioning protrusions 26 of the insulator 20 are fitted in the recesses 27 of the slot 2, so that the fixing position of the insulator 20 with respect to the slot 2 is uniquely determined and further the position of the conductor segments 5 is uniquely determined by the end protrusions 25.

Figure 6:
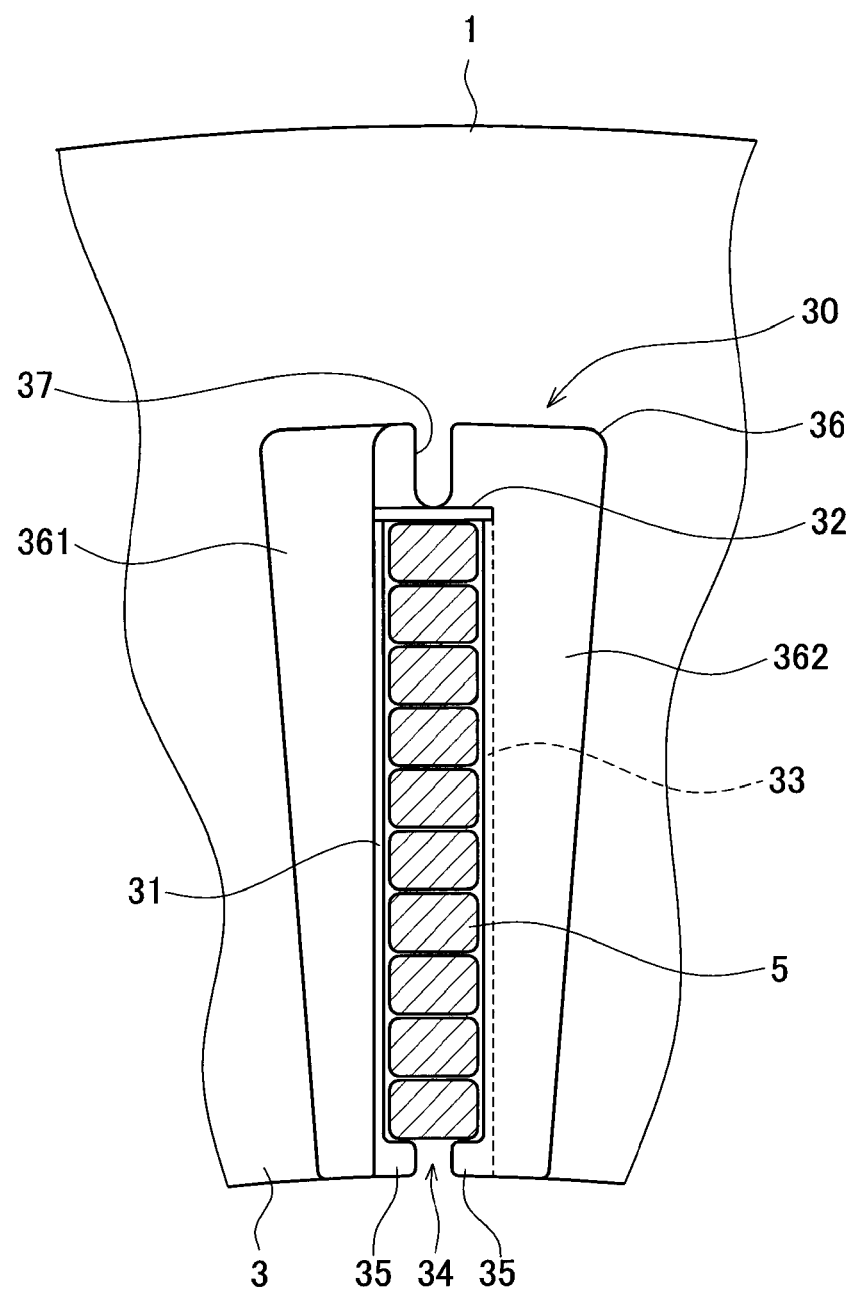
FIG. 6 is a plan view of a stator structure in a third embodiment.
Figure 7:
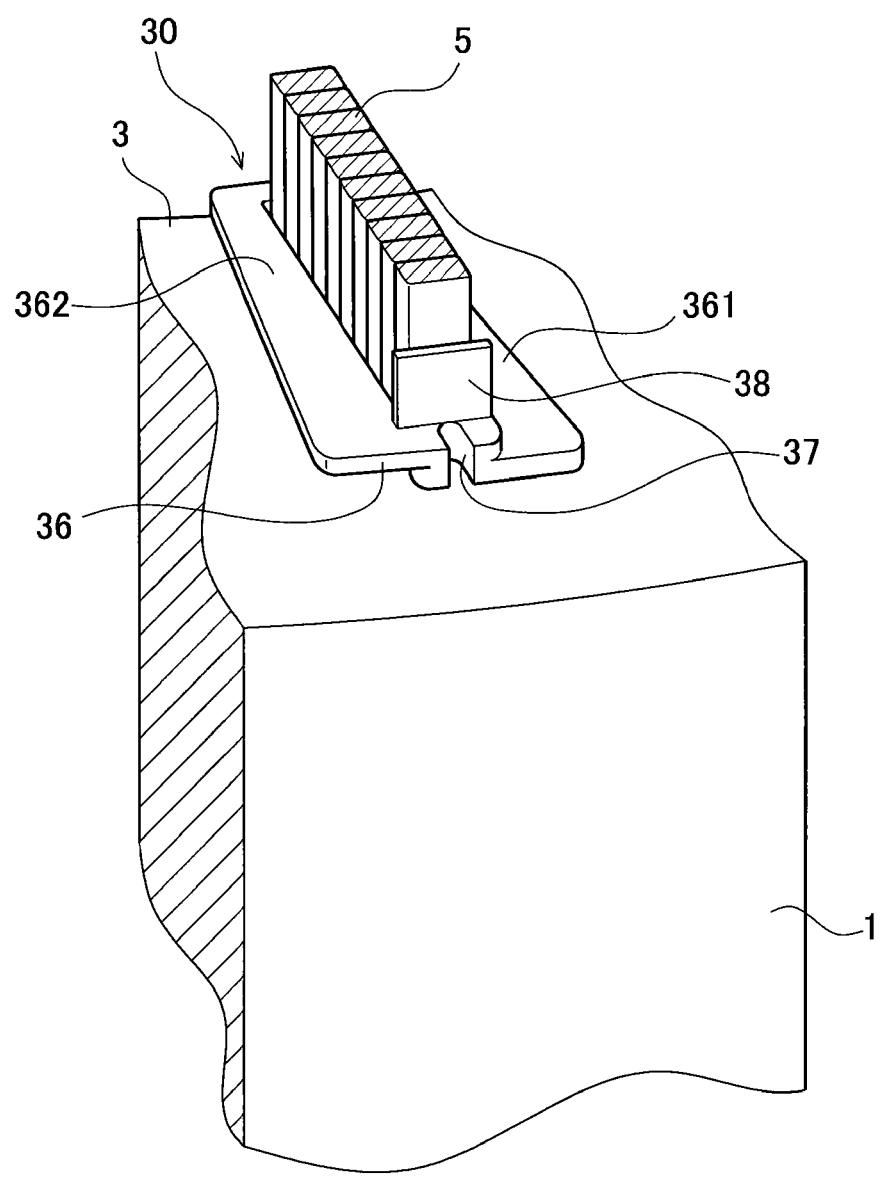
FIG. 7 is a perspective view of the stator structure in the third embodiment.
Figure 8:
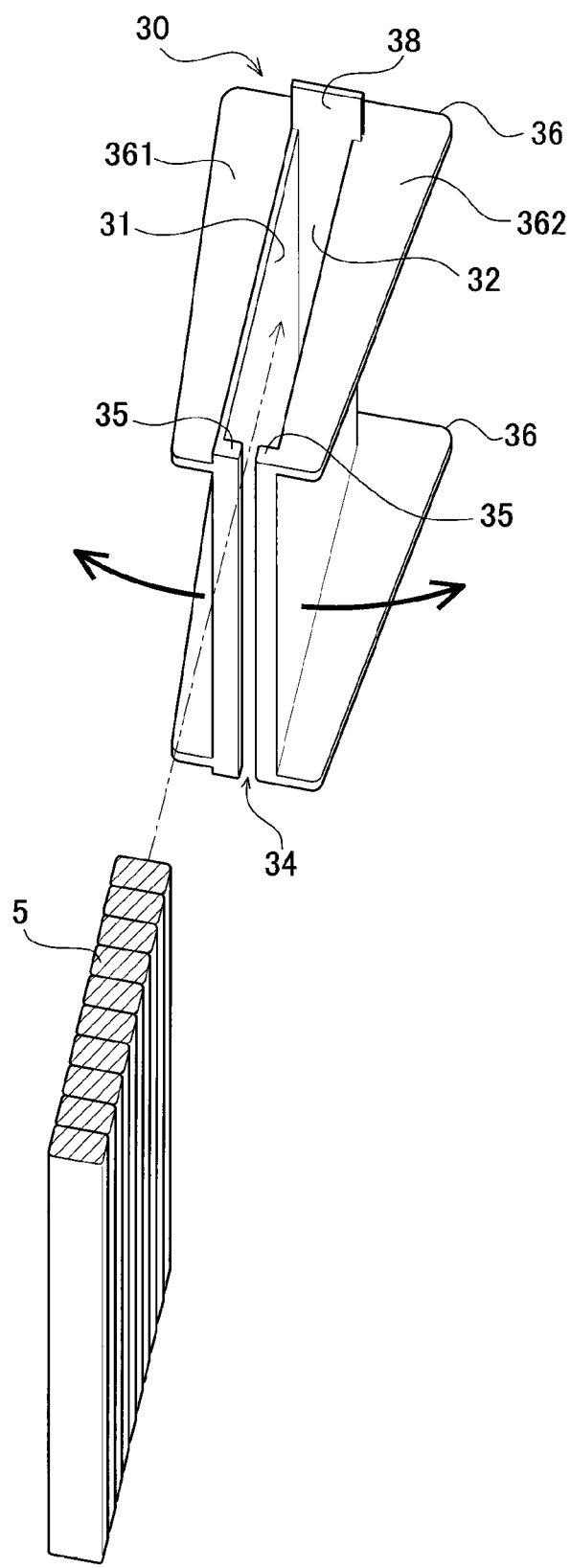
FIG. 8 is a perspective view of an insulator of the stator structure in the third embodiment.
Figure 9:
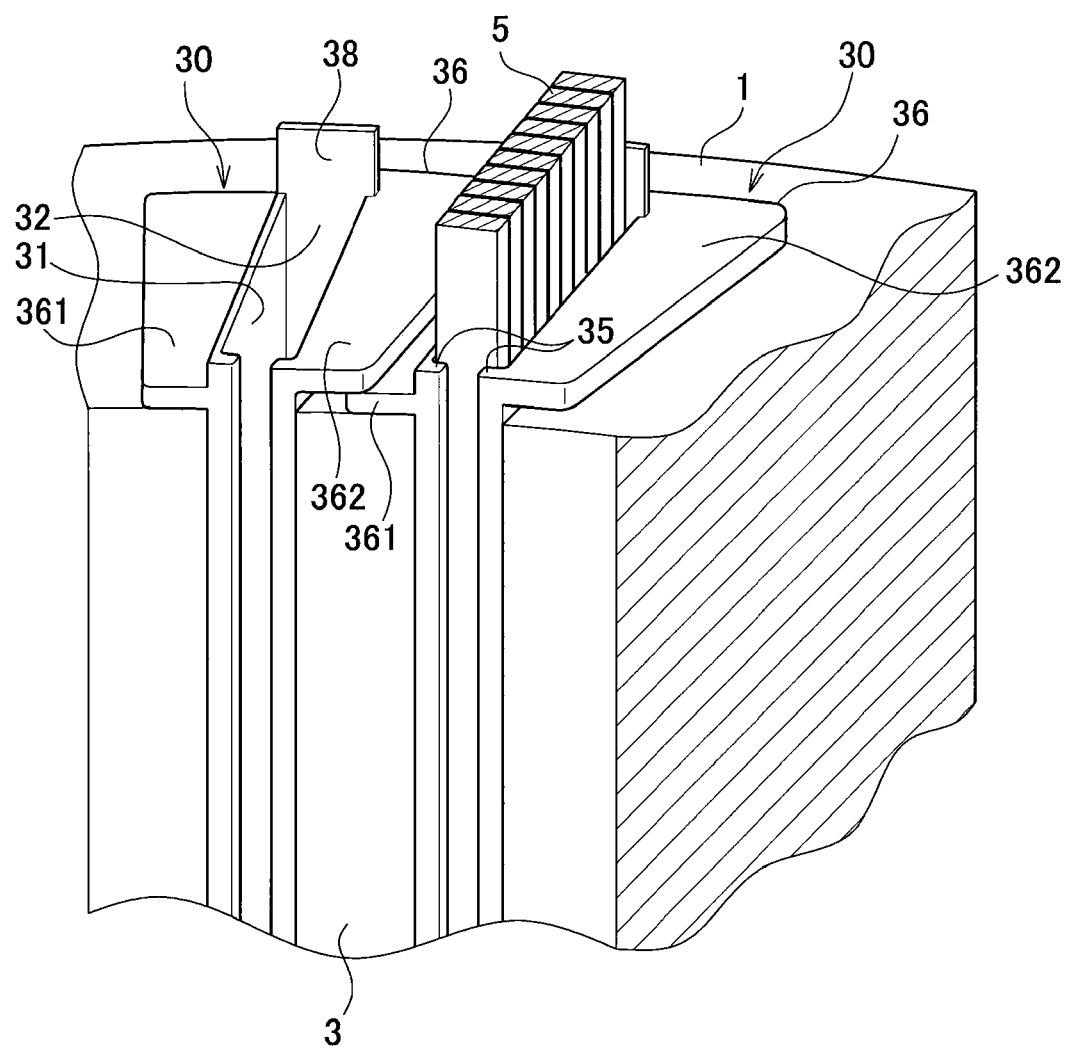
FIG. 9 is a perspective view showing a relationship between insulators inserted in adjacent slots in the stator structure in the third embodiment.
Figure 10:
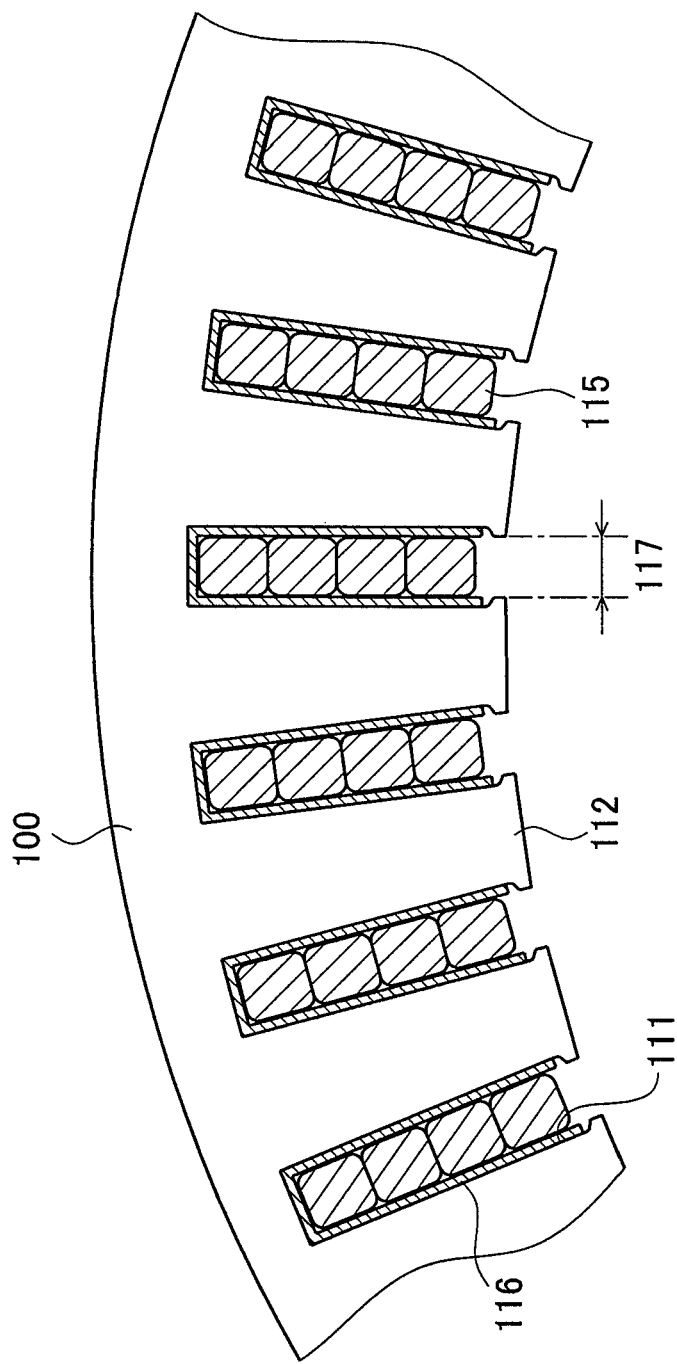
FIG. 10 is a plan view of a conventional stator structure.
Figure 11:
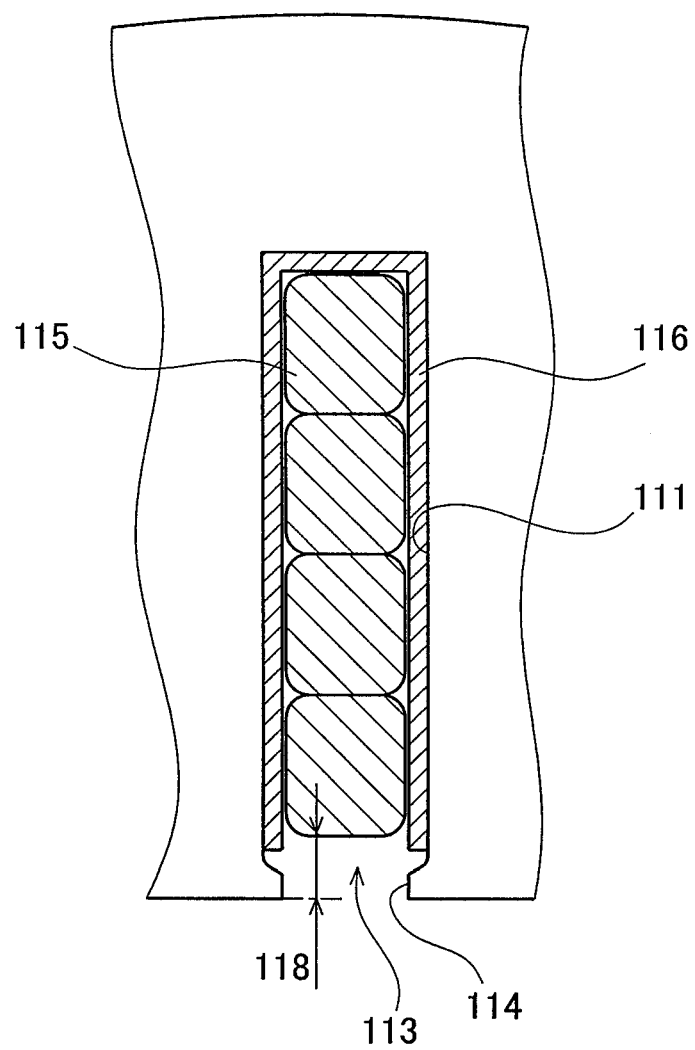
FIG. 11 is an enlarged view of a slot of the stator structure of FIG. 10.

A stator structure of a rotary electric machine in a third embodiment will be described below. FIGS. 6 and 7 are a plan view and a perspective view respectively showing a part of a stator core of the stator structure in the third embodiment. FIG. 8 is a perspective view showing an insulator of the stator structure in the third embodiment. Further, FIG. 9 is a perspective view showing a relationship between adjacent insulators in the stator core of the stator structure in the third embodiment. It is to be noted that similar or identical parts in the following explanation to those in the first embodiment are given the same reference signs to those in the first embodiment.

The insulator 30 in the present embodiment, as in the first embodiment, is made of an insulating and elastic material such as PPS to be insertable in the slot 2 of the stator core 1. The insulator 30 includes side surface portions 31 and 33 and an intermediate portion 32, each being shaped along the groove shape of the slot 2. Further, end protrusions 35 are formed to face each other at free ends of the side surface portions 31 and 33 to define an opening 34. The insulator 30 is also formed with collars 36.

The conductor segments 5 to form the stator coil are bent, from one slot 2 to another slot 2, in a circumferential direction of the stator core 1 as shown in FIG. 4. Therefore, when the conductor segments 5 are bent, the coatings of the conductor segments 5 located on the coil end part may be affected by such deformation. This may deteriorate the insulating performance of the conductor segments 5. In the insulator 30 of the present embodiment, therefore, each collar 36 is formed to ensure a creepage distance from a bent 51 (see FIG. 4) of each conductor segment 5 to the stator core 1 (i.e., a shortest distance at which electric leakage along the surface of an insulating material may occur).

The collars 36 are arranged on both ends of the stator core 1 in the axial direction thereof. Specifically, the collars 36 are formed at the ends in which the side surface portions 31 and 33 and the intermediate portion 32 are continuous to each other so that each collar 36 extends outward in a direction perpendicular to the planes of the side surface portions 31 and 33 and the intermediate portion 32. On the other hand, the collars 36 formed in the insulator 30 restrict warping of the side surface portions 31 and 33. Therefore, each collar 36 is formed with a cutout 37 in a position corresponding to the intermediate portion 32, thereby enabling deformation of the insulator 30 to widen the opening 34. The above first embodiment shows that the side surface portions 11 and 13 are mainly warped to widen the opening 14. In contrast, the present embodiment shows that, instead of the side surface portions 31 and 33, the intermediate portion 32 formed with the cutout 37 is mainly warped to widen the opening 34.

Each collar 36 has an asymmetric shape with the side surface portion 31 and the side surface portion 33 different in positional height (level). Concretely, a collar part 361 located on the side surface portion 31 is placed in contact with the stator core 1 while a collar part 362 located on the side surface portion 33 is placed apart from the stator core 1. The distance from the collar part 362 to the stator core 1 is approximately equal to the thickness of the collar part 361. The sizes of the collar parts 361 and 362 are determined so that the collar part 361 of one insulator 30 and the collar part 362 of another insulator 30 overlap one on the other above a pole piece 3 when the insulators 30 are inserted individually in adjacent slots 2 as shown in FIG. 9. Further, the collars 36 include void portions due to the cutouts 37. To ensure the creepage distance even in those portions at the cutouts 37, therefore, extending portions 38 are formed extending from the intermediate portion 32.

Regarding the above configured stator structure in the present embodiment, as in the first embodiment, a mounting work of the conductor segments 5 and the insulators 30 into the slots 2 is conducted. To be specific, a predetermined number of the conductor segments 5 are inserted in the insulator 30 outside the slot 2. The side surface portions 31 and 33 of the insulator 30 are widened to increase the distance between the end protrusions 35. At that time, the cutouts 37 allow the intermediate portion 32 to be warped freely. The conductor segments 5 are then inserted in the insulator 30 through the thus widened opening 34. While holding the conductor segments 5, the insulator 30 is mounted in the slot 2 of the stator core 1. The insulator 30 mounted in the slot 2 is fixed therein with adhesive.

In the present embodiment, accordingly, the conductor segments 5 are set in the insulator 30 outside the slot 2 and then integrally mounted in the slot 2. Accordingly, even the opening 34 that is smaller than the conductor segments 5 after the conductor segments 5 are mounted in the slot 2 allows the conductor segments 5 to be easily set in the insulator 30. Since the conductor segments 5 can be set in the insulator 30 without stress, there is no possibility that the insulating coating of each conductor segment 5 is not damaged, such as scratched. The conductor segments 5 are positioned by the end protrusions 35, so that the distance from the conductor segment 5 to the end faces of the pole pieces 3 is constant between the slots 2 in any positions after the conductor segments 5 are mounted in the slots 2. This can prevent the conductor segments 5 from becoming too close to a rotor not shown and hence prevent performance deterioration of the rotary electric machine due to the occurrence of eddy currents.

In the present embodiment, furthermore, if the insulation performance is decreased at the bent 51 (see FIG. 4) of each conductor segment 5, the creepage distance from that bent 51 to the pole piece 3 is a distance defined along the surfaces of the protruding collars 361 and 362. Accordingly, the insulator 30 including the collars 36 can ensure a longer creepage distance and thus provide a higher reliable insulation property. In addition, since the collars 361 and 362 are placed overlapping one on the other, a longer creepage distance can be achieved along their surfaces. Since the creepage distance is provided by the collars 36 in the circumferential direction of the stator core 1. This configuration can reduce the height of the coil end part as compared with a configuration providing a creepage distance in a height distance, and thus distribute to downsizing of a rotary electric machine.

Since the side surface portions 31 and 33 of the insulators 30 cannot be warped due to the presence of the collars 36, the openings 34 are hard to open. This disadvantage is solved by the cutouts 37. Consequently, the conductor segments 5 can be easily inserted as mentioned above. On the other hand, the creepage distance is made short by each cutout 37. However, since the cutouts 37 are not provided in the bending direction of the conductor segments 5 and the creepage distance is ensured by the extending portion 38, reliable insulation can be achieved. Furthermore, even though the insulator 30 has an asymmetric shape with the collars 361 and 362 different in height (level), identical insulators can be used to all of the slots 2 of the stator core 1.

The stator structure for rotary electric machine according to the present invention is shown in the above embodiments, but is not limited thereto. The present invention may be embodied in other specific forms without departing from the essential characteristics thereof.

For instance, although the third embodiment shows the insulator 30 including the side surface portions 31 and 33 arranged in parallel, the side surface portions 31 and 33 may be formed to originally have a wider opening 34 as in the second embodiment.

Further, although the third embodiment explains the case where the insulators 30 is fixed with adhesive in the slots 2, the side surface portions 31 and 32 of each insulator 30 may be provided with the positioning protrusions as in the second embodiment. Correspondingly, the wall surface defining each slot 2 is formed with recesses.

The invention claimed is:

1. A stator structure for a rotary electric machine including a stator core having a cylindrical shape in which slots and pole pieces are formed on an inner peripheral side and alternately arranged in a circumferential direction, a conductor segment which is a conducting wire having a rectangular cross-section inserted in one of the slots through an insulator being connected with a conductor segment similarly inserted in another slot to form a coil, wherein each insulator has a shape including a pair of opposite side surface portions connected with an intermediate portion along a wall surface defining the slot, each insulator includes end protrusions formed at free ends of the side surface portions to protrude from the side surface portions in a direction to face each other to position the conductor segment, and the insulators are made of an insulating and elastic material, wherein each insulator includes collars at an end connecting the side surface portions and the intermediate portion so as to be located at an end face of the stator core in an axial direction, the collar being formed to extend almost perpendicular to the side surface portions and the intermediate portion, wherein one of the collars is placed in contact with the stator core while the other collar is placed apart from the stator core at a distance approximately equal to the thickness of the one collar, so that the insulators individually inserted in the adjacent slots are formed with a size so that the one collar of one of the insulators and the other collar of an adjacent one of the insulators overlap one on the other on the pole piece, and wherein the side surface portions on which the one collars are located project above the one collars.

2. The stator structure for a rotary electric machine according to claim 1, wherein each insulator is configured such that the collar located on one of the pair of opposite side surface portions is dislocated from the collar located on the other side surface portion in the axial direction of the stator core.

3. The stator structure for a rotary electric machine according to claim 2, wherein each insulator is formed with a cutout in the collar at a position corresponding to the intermediate portion.

4. The stator structure for a rotary electric machine according to claim 3, wherein the intermediate portion of each insulator extends from the collar to form an extending portion.

5. The stator structure for a rotary electric machine according to claim 2, wherein each of the end protrusions of each insulator is formed with a curved surface at a corner.

6. The stator structure for a rotary electric machine according to claim 1, wherein each insulator is formed with a cutout in the collar at a position corresponding to the intermediate portion.

7. The stator structure for a rotary electric machine according to claim 6, wherein the intermediate portion of each insulator extends from the collar to form an extending portion.

8. The stator structure for a rotary electric machine according to claim 1, wherein each of the end protrusions of each insulator is formed with a curved surface at a corner.

* * * * *